United States Patent
Castellani et al.

(10) Patent No.: US 6,410,651 B1
(45) Date of Patent: Jun. 25, 2002

(54) CABLES WITH A HALOGEN-FREE RECYCLABLE COATING COMPRISING POLYPROPYLENE AND AN ETHYLENE COPOLYMER HAVING HIGH STRUCTURAL UNIFORMITY

(75) Inventors: Luca Castellani, Corsico (IT); Eduardo Grizante Redondo, Sao Paulo (BR); Antonio Zaopo, Milan; Enrico Albizzati, Lesa, both of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/488,829

(22) Filed: Jan. 21, 2000

Related U.S. Application Data

(63) Continuation-in-part of application No. 09/121,558, filed on Jul. 23, 1998, now Pat. No. 6,255,399.

(30) Foreign Application Priority Data

Jul. 23, 1997 (IT) .......................................... MI97A1739

(51) Int. Cl.⁷ .............................. H01B 3/00; H01B 7/00
(52) U.S. Cl. ................................. 525/232; 174/102 SC
(58) Field of Search ........................... 174/103, 102 SC, 174/110 R, 121 A, 120 R, 120 SC; 525/232

(56) References Cited

U.S. PATENT DOCUMENTS 4,098,762 A 7/1978 Miyata et al.

(List continued on next page.)

FOREIGN PATENT DOCUMENTS

| EP | 0 328 051 A1 | 8/1989 |
|---|---|---|
| EP | 0 530 940 A1 | 3/1993 |
| EP | 0 542 253 B1 | 5/1993 |
| EP | 0 618 259 A2 | 10/1994 |
| EP | 0 632 065 A1 | 1/1995 |
| EP | 0 780 425 A1 | 6/1997 |
| EP | 0 416 815 B1 | 8/1997 |
| EP | 0 418 044 B1 | 9/1997 |
| JP | 1-294792 | 11/1989 |
| JP | 3-231944 | 10/1991 |
| JP | 5-17692 | 1/1993 |
| JP | 7-161230 | 6/1995 |
| JP | 63-225641 | 9/1998 |
| WO | WO 93/19107 | 9/1993 |
| WO | WO 94/06859 | 3/1994 |
| WO | WO 96/23311 | 8/1996 |
| WO | WO 96/27885 | 9/1996 |

OTHER PUBLICATIONS

L. Wild et al., "Determination of Branching Distributions in Polyethylene and Ethylene Copolymers," Journal of Polymer Science: Polymer Physics Edition, vol. 20, pp. 441–455 (1982).

(List continued on next page.)

Primary Examiner—Christopher Henderson
(74) Attorney, Agent, or Firm—Finnegan, Henderson, Farabow, Garrett & Dunner, L.L.P.

(57) ABSTRACT

A cable, in particular for power transmission, for telecommunications or for data transmission, or also combined power/telecommunications cables, wherein at least one coating layer consists of a recyclable material which is halogen-free and has superior mechanical, electrical, and flame-retardant properties. This material consists of a polymer mixture comprising: (a) a crystalline propylene homopolymer or copolymer; and (b) a copolymer of ethylene with at least one alpha-olefin having from 4 to 12 carbon atoms, and optionally with a diene; the said copolymer (b) being characterized by a density of between 0.90 and 0.86 g/cm³ and by a Composition Distribution Index, defined as the weight percentage of copolymer molecules having an alpha-olefin content within 50% of the average total molar content of alpha-olefin, of greater than 45%. This material may also include a flame-retardant inorganic filler.

33 Claims, 3 Drawing Sheets

U.S. PATENT DOCUMENTS

| | | |
|---|---|---|
| 4,130,535 A | 12/1978 | Coran et al. |
| 4,145,404 A | 3/1979 | Miyata et al. |
| 4,317,765 A | 3/1982 | Gaylord |
| 4,348,459 A | 9/1982 | Drzal et al. |
| RE31,518 E | 2/1984 | Fischer |
| 4,948,669 A | 8/1990 | Rolland |
| 4,948,840 A | 8/1990 | Berta |
| 4,985,502 A | 1/1991 | Izumi et al. |
| 5,008,204 A | 4/1991 | Stehling |
| 5,229,478 A | 7/1993 | Floyd et al. |
| 5,246,783 A | 9/1993 | Spenadel et al. |
| 5,272,236 A | 12/1993 | Lai et al. |
| 5,414,040 A | 5/1995 | McKay et al. |
| 5,525,757 A | 6/1996 | O'Brien |

OTHER PUBLICATIONS

P.C. Möhring & N.J. Coville, "Homogeneous Group 4 metallocene Ziegler–Natta catalysts: the influence of cyclopentadienyl–ring substituents," Journal of Organometallic Chemistry, vol. 479, pp. 1–29 (1994).

V.K. Gupta et al., "Metallocene Complexes of Group 4 Elements in the Polymerization of Monoolefins," Journal Macromolecular Science: Reviews in Macromolecular Chemistry and Physics, vol. C34, No. 3, pp. 439–514 (1994).

AN 98–205243, "Low–Smoke, Self–Extinguishing Electric Cable Coating Composition—Comprises a Crystalline Propylene Polymer, a Copolymer of Ethylene With an Alpha–Olefin and Optionally a Diene, and Natural Magnesium Hydroxide," Derwent Publications, Ltd., London, GB, XP–002084928 (1998).

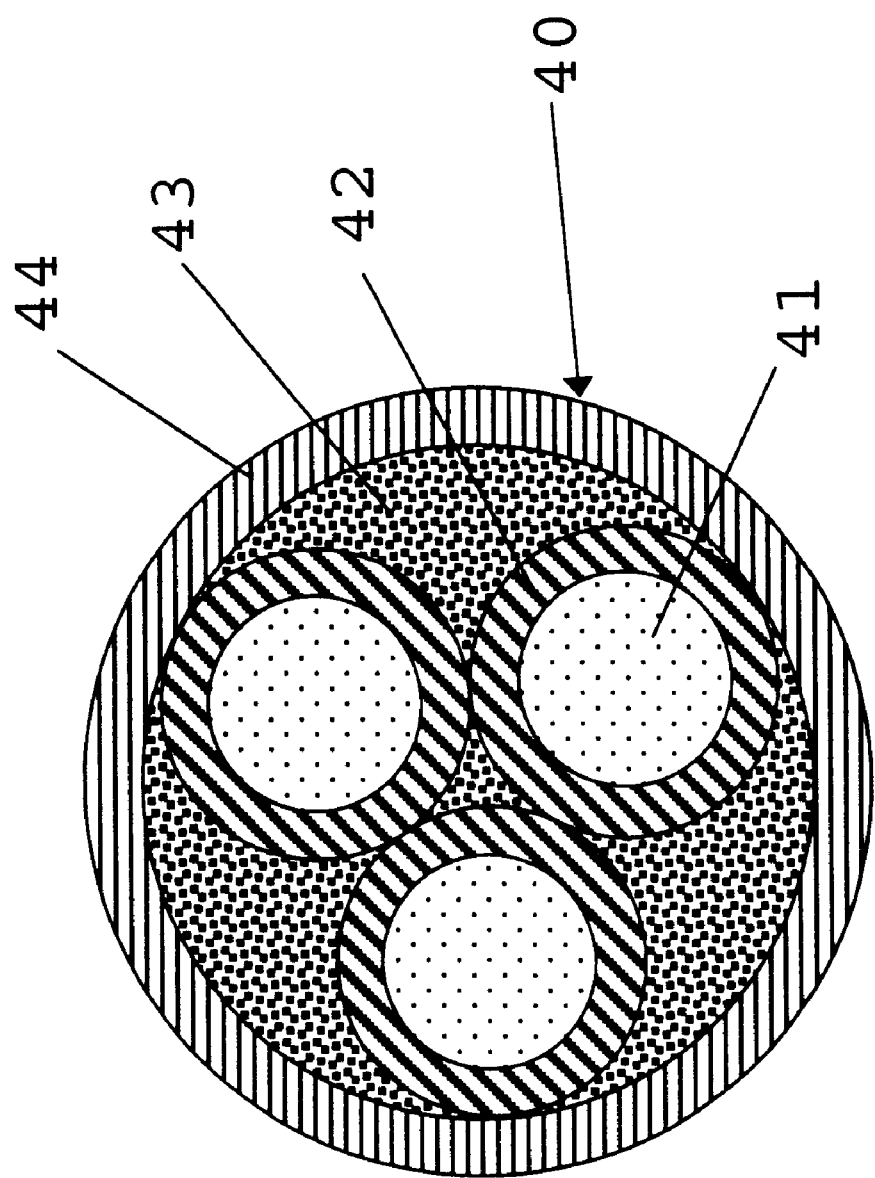

CABLES WITH A HALOGEN-FREE RECYCLABLE COATING COMPRISING POLYPROPYLENE AND AN ETHYLENE COPOLYMER HAVING HIGH STRUCTURAL UNIFORMITY

CROSS-REFERENCE TO RELATED APPLICATIONS

This application is a continuation-in-part of U.S. patent application Ser. No. 09/121,558, filed Jul. 23, 1998 (now U.S. Pat. No. 6,255,399), the content of which is relied upon and incorporated herein by reference; additionally, Applicants claim the right of priority under 35 U.S.C. §119(a)–(d) based on patent application No. MI97A 001739, filed Jul. 23, 1997, in the Italian Patent Office.

FIELD OF THE INVENTION

The present invention relates to cables, in particular for power transmission, for telecommunications or for data transmission, or also combined power/telecommunications cables, wherein at least one coating layer consists of a recyclable material which is halogen-free and has superior mechanical, electrical, and flame-retardant properties.

DESCRIPTION OF THE RELATED ART

There is currently a great need for highly environmentally friendly products, consisting of materials which are not harmful to the environment either during their production or when in use, and which are readily recyclable at the end of their working life. However, the option of using ecological materials is, in all cases, subject to the need to keep costs within acceptable limits, while still guaranteeing performances which are at least equivalent to those of conventional materials and which are, in any case, satisfactory under the most common conditions of use.

In the cables sector, in particular power transmission cables, the various coatings surrounding the conductor commonly consist of crosslinked polymer materials, in particular polyethylene or ethylene copolymers suitably crosslinked during extrusion, so as to give satisfactory mechanical performances even under heating in continuous use and under conditions of current overload, while at the same time maintaining a high level of flexibility. These materials are crosslinked and therefore cannot be recycled since they are devoid of thermoplastic properties, hence they can only be disposed of at the end of their working life by means of incineration. Moreover, in certain cases the outer protective sheath consists of polyvinyl chloride (PVC) which is difficult to separate by conventional methods (for example in water by density differences) from the crosslinked polyolefins containing inorganic fillers (for example from ethylene/propylene rubbers containing inorganic fillers), and, on the other hand, PVC cannot be incinerated together with crosslinked polyolefms since this produces highly toxic chlorinated products by combustion.

In U.S. Pat. No. 4,948,669 cable-coating compositions are described comprising from 29 to 50% by weight of low-density polyethylene, containing as comonomer an alpha-olefin 6u having from 4 to 12 carbon atoms, in particular 1-octene, in an amount such as to obtain a density of between 0.90 and 0.92 g/cm$^3$, in admixture with: (a) a propylene homopolymer; (b) a non-elastomeric copolymer of propylene with ethylene; or (c) heterogeneous copolymers of propylene with ethylene, obtained in reactor. As polyethylene it is particularly suggested using product Dowlex® 4000E from Dow Chemical, containing about 17% of 1-octene and having a melt index equal to 3.3 and a density of 0.912 g/cm$^3$. These are products obtained using titanium-based Ziegler-Natta catalysts, having a relatively high density and thus little flexibility.

In patent application WO 96/23311 a low-voltage, high-current cable is described, wherein the insulating coating, the inner sheath, and the outer sheath are made of the same non-crosslinked polymer-based material which is black coloured by addition of carbon black. Using the same base material would allow recycling without the need to separate different materials. As polymer material for the outer sheath, it is suggested using, in place of PVC, ultra-low-density polyethylene (ULD-PE), for example products Engage® from DuPont-Dow Elastomers and Exxpol® from Exxon. Inorganic fillers such as aluminum or magnesium hydroxide are added to these materials in order to give them flame-retardant properties.

In U.S. Pat. No. 5,246,783 cables are described, having as insulating and/or semiconductive coatings polymer materials based on copolymers of ethylene with at least one $C_3$–$C_{20}$ alpha-olefin, with a density of from 0.86 to 0.96 g/cm$^3$, known commercially under the tradename Exact® from Exxon, preparable using metallocene catalysts. These copolymers are used in crosslinked form, achieved by chemical means (for example with dicumyl peroxide) or by irradiation.

SUMMARY OF THE INVENTION

The Applicant has perceived that the technical problem of obtaining a cable with a coating made of a non-crosslinked, and thus recyclable, polymer material which also has mechanical and electrical properties suitable to the usual conditions of use is dependent on the use of a crystalline propylene homopolymer or copolymer mixed with a copolymer of ethylene with an alpha-olefin having a low density and a high structural uniformity, in particular having a highly homogeneous distribution of the alpha-olefin between the polymer molecules. This high structural uniformity is obtainable in particular by copolymerization of the corresponding monomers in the presence of a single-site catalyst, for example a metallocene catalyst.

In particular, the Applicant has found that excellent performances, both in terms of mechanical properties, in particular elongation at break, stress at break, and modulus, and in terms of electrical properties, may be obtained by using, as non-crosslinked base material for at least one of the coating layers of the cable, a mixture as defined hereinbelow, comprising polypropylene and a copolymer of ethylene with at least one $C_4$–$C_{12}$ alpha-olefin and optionally with a diene comonomer, having a density of from 0.90 to 0.86 g/cm$^3$ and a Composition Distribution Index, defined as the weight percentage of copolymer molecules having an alpha-olefin content within 50% of the average total molar content of alpha-olefin, of greater than 45%.

Therefore, according to a first aspect, the invention relates to a cable comprising a conductor and one or more coating layers, wherein at least one of the said coating layers comprises, as non-crosslinked base polymer material, a mixture comprising: (a) a crystalline propylene homopolymer or copolymer; and (b) a copolymer of ethylene with at least one alpha-olefin having from 4 to 12 carbon atoms, and optionally with a diene; the said copolymer (b) being characterized by a density of from 0.90 to 0.86 g/cm$^3$ and a Composition Distribution Index, defined as the weight percentage of copolymer molecules having an alpha-olefin content within 50% of the average total molar content of alpha-olefin, of greater than 45%.

According to a further aspect, the invention relates to a cable comprising a conductor and one or more coating layers, wherein at least one of the said coating layers has electrical insulating properties and comprises a mixture as defined above as non-crosslinked base polymer material.

According to a further aspect, the invention relates to a cable comprising a conductor and one or more coating layers, wherein at least one of the said coating layers has semiconductive properties and comprises a mixture as defined above as non-crosslinked base polymer material.

According to a further aspect, the invention relates to a cable comprising a conductor and one or more coating layers, wherein at least one of the said coating layers is an outer protective sheath and comprises a mixture as defined above as non-crosslinked base polymer material.

According to a further aspect, the invention relates to a cable comprising a conductor and one or more coating layers, wherein at least 70%, preferably at least 90%, by weight relative to the total weight of the base polymer material of the said coating layers consists of the mixture as defined above.

The Composition Distribution Index provides a measure of the distribution of the alpha-olefin between the copolymer molecules (the higher the value of this index, the more homogeneous is the distribution of the comonomer between the copolymer molecules) and can be determined by techniques of Temperature Rising Elution Fractionation, as described, for example, in U.S. Pat. No. 5,008,204 or in Wild et al., *J. Poly. Sci. Poly. Phys. Ed.*, Vol. 20, p. 441 (1982).

The copolymers (b) have a molecular weight distribution index, defined as the ratio between the weight-average molecular weight $M_w$ and the number-average molecular weight $M_n$, which is generally low, usually between 1.5 and 3.5. The molecular weight distribution index can be determined by conventional methods, by means of Gel Permeation Chromatography (GPC).

The copolymers (b) are also generally characterized by a melting enthalpy of from 30 to 60 J/g.

Copolymers of ethylene with at least one $C_4$–$C_{12}$ alpha-olefin, and optionally with a diene, having these characteristics are obtainable by copolymerization of ethylene with the alpha-olefin, and optionally with the diene comonomer, in the presence of a single-site catalyst, for example a metallocene catalyst, as described, for example, in U.S. Pat. Nos. 5,246,783 and 5,272,236, or alternatively they may be obtained commercially under the trademarks Engage® from DuPont-Dow Elastomers and Exact® from Exxon Chemical. The metallocenes used to polymerize the olefins are coordination complexes of a transition metal, usually from Group IV, in particular titanium, zirconium, or hafnium, with two optionally substituted cyclopentadienyl ligands, used in combination with a co-catalyst, for example an alumoxane, preferably methylalumoxane, or a boron compound (see for example J. M. S.-Rev. Macromol. Chem. Phys., C34(3), pp. 439–514 (1994); J. Organometallic Chemistry, 479 (1994), pp. 1–29, or alternatively U.S. Pat. Nos. 5,414,040 and 5,229,478, and patents WO 93/19107 and EP-A-612,065, or the already mentioned U.S. Pat. Nos. 5,246,783 and 5,272,236). Catalysts which are suitable for obtaining the copolymers (b) according to the present invention are also the so-called Constrained Geometry Catalysts described, for example, in patents EP-416,815 and EP-418, 044.

With the term alpha-olefin it is meant an olefin of formula $CH_2=CH-R$, where R is a linear or branched alkyl having from 2 to 10 carbon atoms. The alpha-olefin may be selected, for example, from 1-butene, 1-pentene, 4-methyl-1-pentene, 1-hexene, 1-octene, 1-dodecene, and the like. 1-hexene and 1-octene are particularly preferred.

When a diene termonomer is present, this generally has from 4 to 20 carbon atoms, and is preferably selected from: linear, conjugated or non-conjugated diolefins, for example 1,3-butadiene, 1,4-hexadiene or 1,6-octadiene; monocyclic or polycyclic dienes, for example 1,4-cyclohexadiene, 5-ethylidene-2-norbornene, 5-methylene-2-norbornene, and the like.

Ethylene/alpha-olefin or ethylene/alpha-olefin/diene copolymers which can be used according to the present invention generally have the following composition: 75–97 mol %, preferably 90–95 mol %, of ethylene; 3–25 mol %, preferably 5–10 mol %, of alpha-olefin; 0–5 mol %, preferably 0–2 mol %, of a diene.

The crystalline propylene homopolymer or copolymer (a) generally has a melting enthalpy of greater than 75 J/g, preferably greater than 85 J/g. It may be selected in particular from:

(1) isotactic propylene homopolymers with an isotactic index of greater than 80, preferably greater than 90, even more preferably greater than 95;

(2) propylene homopolymers obtainable using metallocene catalysts, having a pentad mmmm content of greater than 90% (determined by $^{13}C$—NMR analysis);

(3) crystalline copolymers of propylene with ethylene and/or an alpha-olefin having from 4 to 10 carbon atoms, with an overall content of ethylene and/or alpha-olefin of less than 10 mol %;

(4) heterogeneous propylene copolymers obtainable by block polymerization of propylene and of mixtures of propylene with ethylene and/or an alpha-olefin having from 4 to 10 carbon atoms, containing at least 70% by weight of polypropylene homopolymer or of crystalline propylene/ethylene copolymer, with an isotactic index of greater than 80, the remainder consisting of an elastomeric ethylene/propylene copolymer with a propylene content of from 30 to 70% by weight;

(5) crystalline propylene homopolymers or copolymers of syndiotactic structure, obtainable using metallocene catalysts.

According to the present invention, the ethylene/alpha-olefin or ethylene/alpha-olefin/diene copolymer (b) as described above is present in admixture with the crystalline propylene homopolymer or copolymer (a) in a predetermined amount, such as to make the resulting polymer mixture sufficiently flexible, and in particular so as to give it an elongation at break value, measured according to CEI standard 20-34, §5.1, of at least 100%, preferably of at least 200%, and a 20% modulus value, measured according to CEI standard 20-34, §5.1, of less than 10 MPa, preferably less than 7 MPa.

In general, these characteristics are obtainable using mixtures comprising from 10 to 60%, preferably from 15 to 50%, by weight of crystalline propylene homopolymer or copolymer (a) and from 40 to 90%, preferably from 50 to 85%, by weight of ethylene/alpha-olefin or ethylene/alpha-olefin/diene copolymer (b), the percentages being relative to the total weight of the polymeric components (a) and (b).

In accordance with the present invention, the use of non-crosslinked polymer mixtures as defined above makes it possible to obtain a recyclable, flexible coating which has excellent mechanical properties, both in terms of modulus and in terms of elongation and stress at break. In particular, it is possible to obtain mechanical performances under heating, that is at 90° C. for continuous use and at 130° C. in the case of current overload, which are comparable with the typical performances of the polyethylene-based crosslinked coatings currently on sale, making the above-mentioned mixtures suitable not only for low-voltage but also for medium- and high-voltage cables. The term "low-voltage" generally means a voltage of less than 5 kV, preferably less than 2 kV, mind even more preferably less than 1 kV, The mechanical properties mentioned above are accompanied by excellent electrical properties, such as insulation constant (Ki) and dielectric loss (tan delta), both under dry conditions and when the cable is submerged in water. In particular, it has been found that the non-crosslinked material according to the present invention has a very high insulation constant which is maintained within acceptable values even after prolonged immersion in water.

The fact that an insulating material has low water absorption makes it possible to reduce dielectric loss remarkably and thus to achieve lower energy dissipation levels, in particular during high power transmission. In the case of low-voltage, high-current power transmission, low water absorption avoids an excessive reduction of electrical resistivity of the insulating material and thus of its electrical performance.

The polymer mixtures according to the present invention are also capable of containing inorganic fillers without an unacceptable reduction in their mechanical and elastic properties, in particular as to elongation at break, which remains well above 100%. It is thus possible to produce compositions with flame-retardant properties which are endowed with high flexibility and high mechanical strength.

Thus, according to a further aspect, the present invention relates to a flame-retardant polymer composition, comprising:

(a) a crystalline propylene homopolymer or copolymer;
(b) a copolymer of ethylene with at least one alpha-olefin having from 4 to 12 carbon atoms, and optionally with a diene; the said copolymer (b) being characterized by a density of between 0.90 and 0.86 g/cm$^3$ and by a Composition Distribution Index, defined as the weight percentage of copolymer molecules having an alpha-olefin content within 50% of the average total molar content of alpha-olefin, of greater than 45%;
(c) an inorganic filler in an amount such as to impart flame-retardant properties.

Moreover, a further aspect of the present invention resides in a cable comprising a conductor and one or more coating layers, wherein at least one of the said coating layers comprises a flame-retardant polymer composition as defined above.

The inorganic filler is generally an inorganic oxide, preferably in hydrate or hydroxide form. Examples of suitable compounds are aluminum, bismuth, cobalt, iron, magnesium, titanium or zinc oxides and the corresponding hydroxides, or mixtures thereof Magnesium hydroxide, aluminum hydroxide, and alumina trihydrate ($Al_2O_3 \cdot 3H_2O$) or mixtures thereof are particularly preferred. One or more inorganic oxides or salts such as CoO, $TiO_2$, $Sb_2O_3$, ZnO, $Fe_2O_3$, $CaCO_3$, or mixtures thereof may advantageously be added to these compounds in minor amounts, generally less than 25% by weight. Preferably, the above-mentioned metal hydroxides, in particular magnesium and aluminium hydroxides, are used in the form of particles having sizes which can range from 0.1 to 100 $\mu$m, preferably from 0.5 to 10 $\mu$m. In the case of hydroxides, these may advantageously be used in the form of coated particles. Saturated or unsaturated fatty acids containing from 8 to 24 carbon atoms, and metal salts thereof, are usually used as coating materials, such as, for example: oleic acid, palmitic acid, stearic acid, isostearic acid, lauric acid; magnesium or zinc stearate or oleate; and the like.

The amount of inorganic filler which is suitable for imparting flame-retardant properties may vary within a wide range, generally between 10 and 80% by weight, preferably between 30 and 70% by weight, with respect to the total weight of the composition.

The flame-retardant compositions according to the present invention can be prepared by mixing the polymer components, the filler, and the additives according to conventional techniques. The mixing can be carried out, for instance, by using an internal mixer having tangential rotors (Banbury) or interpenetrating rotors. Alternatively, the flame-retardant composition can be prepared by means of a continuous mixer, for instance a Ko-Kneader (Buss) or a co-rotating or counter-rotating twin-screw mixer.

The flame-retardant composition according to the present invention can be employed to produce a self-extinguishing cable wherein a layer of the flame-retardant composition is formed around an electrical conductor. That layer can be deposited either directly onto an electrical conductor or onto an electrical conductor previously coated with at least an insulating layer. The deposition of the flame-retardant composition can be carried out according to known techniques, generally by means of an extrusion apparatus. When the cable has at least two layers, the coating process can be carried out in separate steps, for instance by extruding the inner layer onto the conductor in a first step and the outer layer onto that inner layer in a second step. The coating process can advantageously be carried out in a single passage, for example by a "tandem" extrusion process, wherein two separate extruder heads are arranged in series, or, alternatively, by a co-extrusion process, by means of a multiple extrusion head.

The resulting flame-retardant layer is preferably thermoplastic, i.e., non-crosslinked, and therefore it can be easily recycled after separating it from the other components of the cable.

A coupling agent selected from those known in the art, for example silane compounds or carboxylic derivatives having at least one ethylenic unsaturation can be added to the mixture in order to enhance the compatibility between the inorganic filler and the polymer matrix.

Examples of silane compounds which are suitable for this purpose are; γ-methacryloxypropyltrimethoxy-silane, methyltriethoxysilane, methyltris(2-methoxyethoxy)silane, dimethyldiethoxysilane, vinyltris(2-methoxyethoxy)silane, vinyltrimethoxysilane, vinyltriethoxysilane, octyltriethoxysilane, isobutyltriethoxysilane, isobutyltrimethoxysilane, and mixtures thereof.

Carboxylic derivatives with ethylenic unsaturation which may advantageously be used as coupling agents are, for example, unsaturated carboxylic anhydrides or, preferably, unsaturated dicarboxylic anhydrides; maleic anhydride is particularly preferred. Alternatively, it is possible to use polyolefins as compatibilizing agents, these polyolefins optionally containing ethylenic unsaturations, on which carboxylic groups have been grafted by reaction with the above-mentioned carboxylic derivatives having at least one ethylenic unsaturation.

The coupling agent, either of silane type or of carboxylic type, can be used in its normal state or can be grafted to at least one of the polymer components of the mixture.

The amount of coupling agent to be added to the mixture may vary mainly depending on the type of coupling agent used and on the amount of inorganic filler added, and is generally between 0.05 and 30%, preferably between 0.1 and 20%, by weight, relative to the total weight of the base polymer mixture.

Other conventional components such as antioxidants, fillers, processing co-adjuvants, lubricants, pigments, water-tree retardant additives and the like are usually added to the base polymer material. In the case of the semiconductive layers 3 and 5, the polymer material is preferably filled with carbon black in an amount such as to give this material semiconductive properties (namely, so as to obtain a resistivity of less than 5 ohm-m at room temperature).

Suitable conventional antioxidants are, for example: polymerized trimethyldihydroquinoline, 4,4'-thiobis(3-methyl-6-tert-butyl)phenol; pentaerytbryl-tetra[3-(3,5-di-tert-butyl-4-hydroxyphenyl)propionate], 2,2'-thiodiethylene-bis[3-(3,5-di-tert-butyl-4-hydroxyphenyl)propionate] and the like, or mixtures thereof.

Other fillers which may be used in the present invention include, for example, glass particles, glass fibres, calcined kaolin, talc and the like, or mixtures thereof. Processing co-adjuvants usually added to the polymer base are, for example, calcium stearate, zinc stearate, stearic acid, paraffin wax and the like, or mixtures thereof

BRIEF DESCRIPTION OF THE DRAWINGS

Further details will be illustrated in the following detailed description, with reference to the appended drawing, wherein:

FIG. 4 is a cross-section of a low-voltage electrical cable of the tripolar type according to a further embodiment of the present invention.

DETAILED DESCRIPTION OF THE PREFERRED EMBODIMENT

Figure 1:
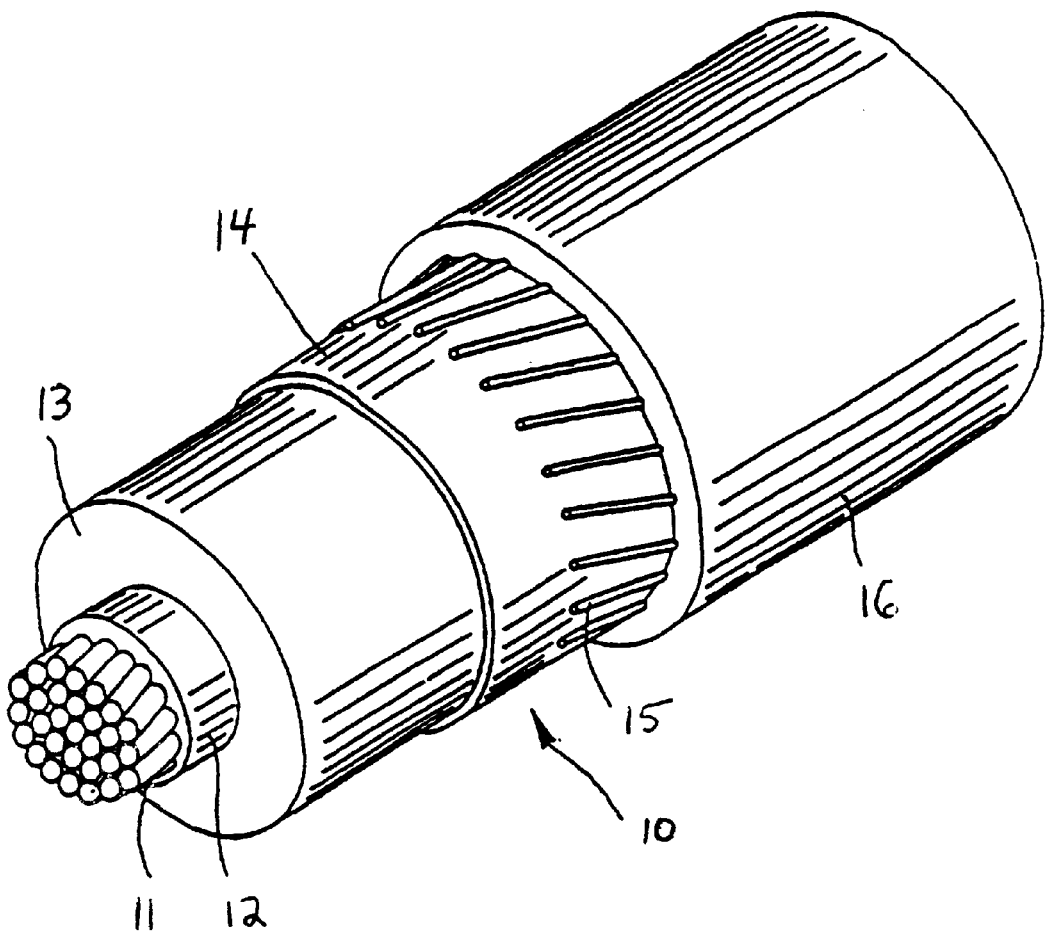
FIG. 1 is a perspective view of an electrical cable, particularly suitable for medium voltages, according to an embodiment of the present invention.

In FIG. 1, electrical cable 10 comprises a conductor 11; an inner layer 12 with semiconductive properties; an intermediate layer 13 with insulating properties; an outer layer 14 with semiconductive properties; a screen 15; and an outer sheath 16.

The conductor 11 generally consists of metal wires, preferably made of copper or aluminium, which are braided together using conventional techinques.

At least one of the layers 12, 13, and 14, and preferably at least the insulating layer 13, comprises polypropylene as non-crosslinked base polymer material, mixed with a copolymer of ethylene with at least one alpha-olefin, and optionally with a diene, as defined above. In a preferred embodiment of the present invention, all of the insulating and semiconductive layers 12, 13, and 14 comprise a polymer mixture as defined above as non-crosslinked base polymer material.

A screen 15, generally consisting of helically wound electrically conductive wires or strips, is usually placed around the outer semiconductive layer 14. This screen is then covered with a sheath 16, consisting of a thermoplastic material such as polyvinyl chloride (PVC), non-crosslinked polyethylene (PE) or, preferably, a mixture comprising polypropylene and an ethylene/alpha-olefin or ethylene/alpha-olefin/diene copolymer, as defined above.

FIG. 1 shows only one possible embodiment of a cable according to the present invention. It is clear that suitable changes known in the art may be made to this embodiment without thereby departing from the scope of the present invention. In particular, the recyclable polymer mixtures according to the present invention may advantageously also be used for coating telecommunications cables or data transmission cables, or alternatively combined power/telecommunications cables.

Figure 2:
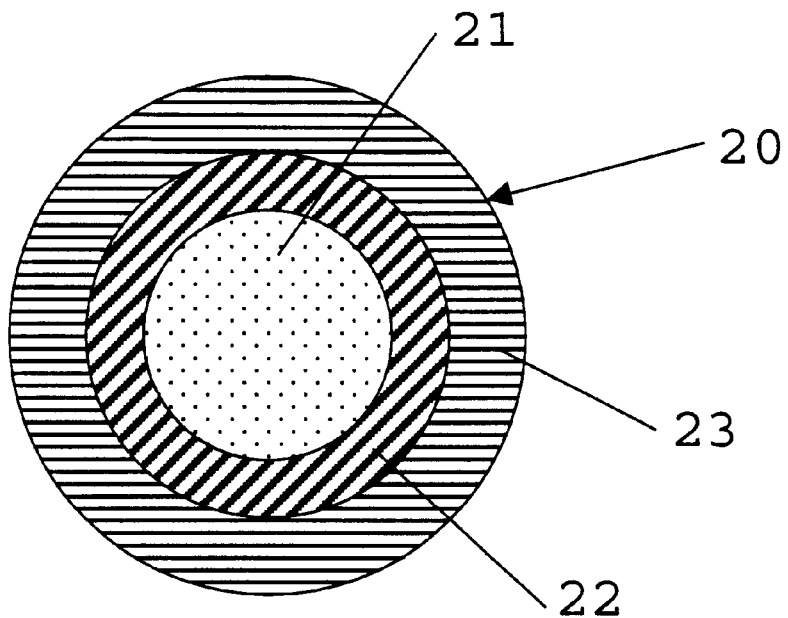
FIG. 2 is a cross-section of a low-voltage electrical cable of the unipolar type according to another embodiment of the present invention.

With reference to FIG. 2, a cable 20 comprises a metal conductor 21, an electrically insulating inner layer 22, and an outer layer 23 made of a flame-retardant composition according to the present invention.

The inner layer 22 can be made of a crosslinked or non-crosslinked, preferably halogen-free, polymer composition, selected, for example, from: polyolefins (homopolymers or copolymers of different olefins), olefin/ethylenically unsaturated ester copolymers, polyesters, polyethers, polyether/polyester copolymers and mixtures thereof. Examples of such polymers are: polyethylene (PE), in particular linear low-density PE (LLDPE); polypropylene (PP); propylene/ethylene thermoplastic copolymers; ethylene-propylene rubbers (EPR) or ethylene-propylene-diene rubbers (EPDM); natural rubbers; butyl rubbers; ethylene/vinyl acetate (EVA) copolymers; ethylene/methyl acrylate (EMA) copolymers; ethylene/ethyl acrylate (EEA) copolymers; ethylene/butyl acrylate (EBA) copolymers; ethylene/alpha-olefin copolymers, and the like. It is also possible to use the same base polymer material for the inner layer 22 as for the outer layer 23.

Figure 3:
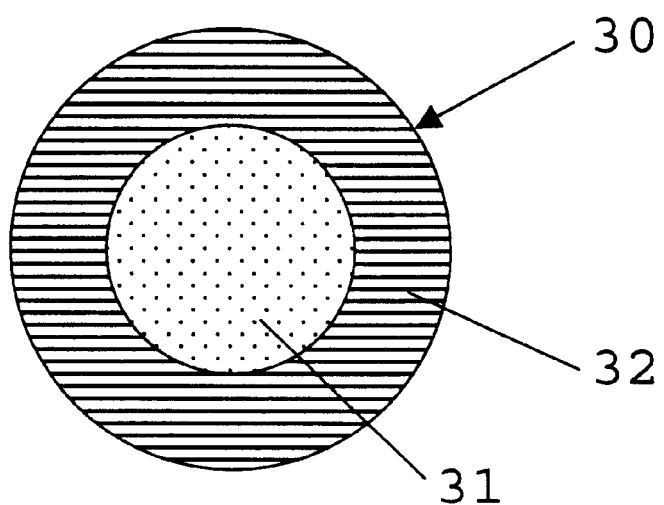
FIG. 3 is a cross-section of a low-voltage electrical cable of the unipolar type according to yet another embodiment of the present invention.

With reference to FIG. 3, a cable 30 comprises a conductor 31 directly coated with a flame-retardant composition according to the present invention to form an outer layer 32, without interposing any insulating layer. In this case the outer layer 32 also acts as electrical insulation.

A thin polymer layer (not shown in the figures) acting as an anti-abrasive coating, can also be applied externally to the outer layer 32.

To give an identification coloring to the cable, a pigment can be optionally added to the materials forming the outer layer 32 or the anti-abrasive coating. Alternatively, a colored thread can be externally applied.

With reference to FIG. 4, a cable 40 of the tripolar type comprises three conductors 41, each coated with an insulating layer 42, of which two are phase conductors, the third one is the neutral conductor. The insulating layers 42 can be made of an insulating polymer material as described above, or also of a flame-retardant composition, particularly that according to the present invention. The so insulated conductors 41 are stranded together and the interstices between the insulated conductors 41 are filled with a filling material 43 to form a continuous structure having a substantially cylindrical shape. The filling material 43 is preferably a flame-retardant material, usually a low viscosity, low cost polymer filled with a flame-retardant filler such as those described above. On the so obtained structure an external sheath 44 made of the flame-retardant composition according to the present invention is applied, usually by extrusion.

FIGS. 2, 3, and 4 show only some possible embodiments of cables according to the present invention. Suitable modifications can be made to these embodiments, without thereby departing from the scope of the present invention. Particularly, telecommunications cables or data transmission cables, or also combined energy/telecommunications cables, can be produced using the flame-retardant compositions according to the present invention. In addition, although the present description is mainly directed to self-extinguishing cables, the flame-retardant compositions according to the invention can be used to impart self-extinguishing properties to other articles, in particular to other electrical devices such as electrical cable joints or The properties of the polymer materials used according to the present invention (Cop. 1 and 2) and of the material used for comparative purposes (Cop. 3) are given in Table 1. As melting enthalpy the second melting value ($\Delta H_{2m}$) is given, obtained by DSC at a scan speed of 10° C./min. The melt flow index (MFI) was measured according to ASTM standard D 1238/L (at 230° C. and 21.6 N for polypropylene, and at 190° C. and 21.6 N for ethylene/1-octene copolymers). The Composition Distribution Index (CDI) was determined by Temperature Rising Elution Fractionation techniques.

TABLE 1

| Polymer material | Density (g/cm³) | MFI (dg/min) | CDI | $\Delta H_{2m}$ (J/g) |
|---|---|---|---|---|
| PP1 | 0.9 | 1.6 | — | 98 |
| PP2 | 0.9 | 1.8 | — | 90 |
| Cop. 1 | 0.885 | 1 | >70 | 55.6 |
| Cop. 2 | 0.868 | 0.5 | >70 | 34.4 |
| Cop. 3 | 0.902 | 3 | — | 78 |

PP 1 (Moplen® S30G—Montell): isotactic polypropylene (homopolymer);

PP 2 (Moplen® EP2S30B—Montell): random crystalline propylene/ethylene copolymer;

Cop. 1 (Engage® 8003—DuPont-Dow Elastomers): ethylene/1-octene copolymer with 82/18 weight ratio (5.5 mol % of 1-octene), obtained by metallocene catalysis;

Cop. 2 (Engage® 8150—DuPont-Dow Elastomers): ethylene/1-octene copolymer with 75/25 weight ratio (7.6 mol % of 1-octene), obtained by metallocene catalysis;

Cop. 3 (Stamylex® TMX 1000—DSM): ethylene/1-octene copolymer (4.6 mol % of 1-octene), obtained using a titanium Ziegler-Natta catalyst.

The polymer materials in Table 1 were used to prepare the mixtures given in Table 2.

The mixtures 1–3a were prepared in a Brabender mixer (volume of the mixing chamber: 80 cm³), filled to 95% of volume. Mixing was carried out at a temperature of 170° C. for a total time of 10 min (rotor speech: 40 rpm). At the end of the mixing, the final torque (reported in Table 2) was measured under the abovementioned conditions.

Mixtures 4, 5, and 6 were prepared in a 20 mm-diameter counter-rotatory Brabender twin-screw mixer with a rotor speed of 50 rpm and with the following temperature profile: 1st zone=100° C., 2nd zone=160° C., 3rd zone=190° C., 4th zone=190° C.

For the filled systems there were used:

Hydrofy® GS-1.5: $Mg(OH)_2$ coated with stearic acid from SIMA (average particle diameter: 2 μm; specific surface: 11 m²/g);

Rhodorsil® MF175U: silicone rubber from Rhône-Poulenc acting as processing co-adjuvant/lubricant.

The following were used as antioxidants:

Irganox® 1010: pentaerythritol tetra[3-(3,5-di-tert-butyl-4-hydroxyphenyl)propionate] (Ciba-Geigy);

Irganox® PS802 FL: distearyl thiodipropionate (DSTDP) (Ciba-Geigy).

The compositions are given in Table 2 as phr (i.e. parts by weight per 100 parts of polymer matrix).

The mixtures thus obtained were subjected to mechanical tensile strength tests according to CEI standard 20-34, §5.1, on test specimens obtained from 1 mm-thick plates obtained by compression moulding at 190–195° C. and 200 bar after preheating for 5 min at the same temperature. The pulling speed of the clamps was 250 mm/min for mixtures 1–3a, and 50 mm/min for mixtures 4, 5, and 6. The results are given in Table 2.

TABLE 2

| EXAMPLE | 1 | 1a | 2 | 2a | 3 (*) | 3a (*) | 4 | 5 | 6 (*) |
|---|---|---|---|---|---|---|---|---|---|
| PP 1 | — | — | — | — | — | — | 40 | 40 | 40 |
| PP 2 | 35 | 35 | 35 | 35 | 35 | 35 | — | — | — |
| Cop. 1 | 65 | 65 | — | — | — | — | 60 | — | — |
| Cop. 2 | — | — | 65 | 65 | — | — | — | 60 | — |
| Cop. 3 | — | — | — | — | 65 | 65 | — | — | 60 |
| Hydrofy ® GS-1.5 | — | 160 | — | 160 | — | 160 | — | — | — |
| Rhodorsil ® MF175U | — | 1.5 | — | 1.5 | — | 1.5 | — | — | — |
| Irganox ® PS 802FL | — | — | — | — | — | — | 0.2 | 0.2 | 0.2 |
| Irganox ® 1010 | — | 0.5 | — | 0.5 | — | 0.5 | 0.1 | 0.1 | 0.1 |
| Final torque (N – m) | 6.2 | 9.8 | 7.8 | 11.2 | 6.1 | 7.3 | — | — | — |
| Stress at break (MPa) | 16.7 | 10.5 | 17.5 | 10.4 | 6.9 | 5.5 | 1.51 | 20.4 | 9.1 |
| Elongation at break (%) | 662 | 567 | 713 | 621 | 711 | 54 | 702 | 695 | 33 |
| 10% modulus (MPa) | −6 | −5.6 | −4.8 | −4.7 | −8 | −6.6 | 4.1 | 4.5 | 8.3 |
| 20% modulus (MPa) | | | | | | | — | — | — |

(*) comparative

We claim:

1. A cable, comprising:

a conductor; and a coating layer comprising a flame-retardant polymer composition;

wherein the flame-retardant polymer composition comprises:

a crystalline propylene homopolymer or copolymer;

a copolymer of ethylene with at least one alpha-olefin having from 4 to 12 carbon atoms, the copolymer of ethylene having a density of from 0.86 g/cm³ to 0.90 g/cm³ and by a Composition Distribution Index, defined as a weight percentage of copolymer molecules having an alpha-olefin content within 50% of an average total molar content of alpha-olefin, of at least 45%;

a flame-retardant inorganic filler.

2. The cable of claim 1, further comprising an electrically insulating inner layer placed between the conductor and the coating layer.

3. The cable of claim 1, wherein the copolymer of ethylene further comprises a diene.

4. The cable of claim 1, wherein the copolymer of ethylene has a melting enthalpy of from 30 J/g to 60 J/g.

5. The cable of claim 1, wherein the copolymer of ethylene has a molecular weight distribution index of from 1.5 to 3.5.

6. The cable of claim 1, wherein the copolymer of ethylene is obtained by copolymerization of corresponding monomers in a presence of a single-site catalyst.

7. The cable of claim 1, wherein the at least one alpha-olefin in the copolymer of ethylene is 1-hexene.

8. The cable of claim 1, wherein the at least one alpha-olefin in the copolymer of ethylene is 1-octene.

9. The cable of claim 1, wherein the crystalline propylene homopolymer or copolymer has a melting enthalpy of at least 75 J/g.

10. The cable of claim 1, wherein the flame-retardant polymer composition comprises from 10% to 60% by weight of the crystalline propylene homopolymer or copolymer, and from 40% to 90% by weight of the copolymer of ethylene, percentages being relative to a total weight of polymeric components.

11. The cable of claim 10, wherein the flame-retardant polymer composition comprises from 20% to 40% by weight of the crystalline propylene homopolymer or copolymer, and from 60% to 80% by weight of the copolymer of ethylene, the percentages being relative to the total weight of the polymeric components.

12. The cable of claim 1, wherein the inorganic filler is an inorganic oxide or hydroxide.

13. The cable of claim 1, wherein the inorganic filler is selected from magnesium hydroxide, aluminum hydroxide, alumina trihydrate ($Al_2O_3 \cdot 3H_2O$), and mixtures thereof.

14. The cable of claim 1, wherein the inorganic filler is present in an amount of from 10% to 80% by weight, with respect to a total weight of the flame-retardant polymer composition.

15. The cable of claim 14, wherein the inorganic filler is present in an amount of from 30% to 70% by weight, with respect to the total weight of the flame-retardant polymer composition.

16. The cable of claim 1, wherein the flame-retardant polymer composition further comprises a coupling agent.

17. A cable, comprising:

a plurality of conductors each coated with a layer of an insulating polymer material and arranged to form interstitial spaces;

a flame-retardant filling material disposed in the interstitial spaces; and an external sheath;

wherein the external sheath comprises a flame-retardant polymer composition comprising:

a crystalline propylene homopolymer or copolymer;

a copolymer of ethylene with at least one alpha-olefin having from 4 to 12 carbon atoms, the copolymer of ethylene having a density of from 0.86 g/cm$^3$ to 0.90 g/cm$^3$ and by a Composition Distribution Index, defined as a weight percentage of copolymer molecules having an alpha-olefin content within 50% of an average total molar content of alpha-olefin, of at least 45%;

a flame-retardant inorganic filler.

18. The cable of claim 17, wherein the layer coating each conductor comprises a flame-retardant polymer composition.

19. The cable of claim 18, wherein the layer coating each conductor comprises a flame-retardant polymer composition comprising:

a crystalline propylene homopolymer or copolymer;

a copolymer of ethylene with at least one alpha-olefin having from 4 to 12 carbon atoms, the copolymer of ethylene having a density of from 0.86 g/cm$^3$ to 0.90 g/cm$^3$ and by a Composition Distribution Index, defined as the weight percentage of copolymer molecules having an alpha-olefin content within 50% of the average total molar content of alpha-olefin, of at least 45%;

a flame-retardant inorganic filler.

20. The cable of claim 17, wherein the copolymer of ethylene further comprises a diene.

21. The cable of claim 17, wherein the copolymer of ethylene has a melting enthalpy of from 30 J/g to 60 J/g.

22. The cable of claim 17, wherein the copolymer of ethylene has a molecular weight distribution index of from 1.5 to 3.5.

23. The cable of claim 17, wherein the copolymer of ethylene is obtained by copolymerization of corresponding monomers in a presence of a single-site catalyst.

24. The cable of claim 17, wherein the at least one alpha-olefin in the copolymer of ethylene is 1-hexene.

25. The cable of claim 17, wherein the at least one alpha-olefin in the copolymer of ethylene is 1-octene.

26. The cable of claim 17, wherein the crystalline propylene homopolymer or copolymer has a melting enthalpy of at least 75 J/g.

27. The cable of claim 17, wherein the flame-retardant polymer composition comprises from 10% to 60% by weight of the crystalline propylene homopolymer or copolymer, and from 40% to 90% by weight of the copolymer of ethylene, percentages being relative to a total weight of polymeric components.

28. The cable of claim 27, wherein the flame-retardant polymer composition comprises from 20% to 40% by weight of the crystalline propylene homopolymer or copolymer, and from 60% to 80% by weight of the copolymer of ethylene, the percentages being relative to the total weight of the polymeric components.

29. The cable of claim 17, wherein the inorganic filler is an inorganic oxide or hydroxide.

30. The cable of claim 17, wherein the inorganic filler is selected from magnesium hydroxide, aluminum hydroxide, alumina trihydrate ($Al_2O_3 \cdot 3H_2O$), and mixtures thereof.

31. The cable of claim 17, wherein the inorganic filler is present in an amount of from 10% to 80% by weight, with respect to the total weight of the flame-retardant polymer composition.

32. The cable of claim 31, wherein the inorganic filler is present in an amount of from 30% to 70% by weight, with respect to a total weight of the flame-retardant polymer composition.

33. The cable of claim 17, wherein the flame-retardant polymer composition further comprises a coupling agent.

* * * * *